UNITED STATES PATENT OFFICE.

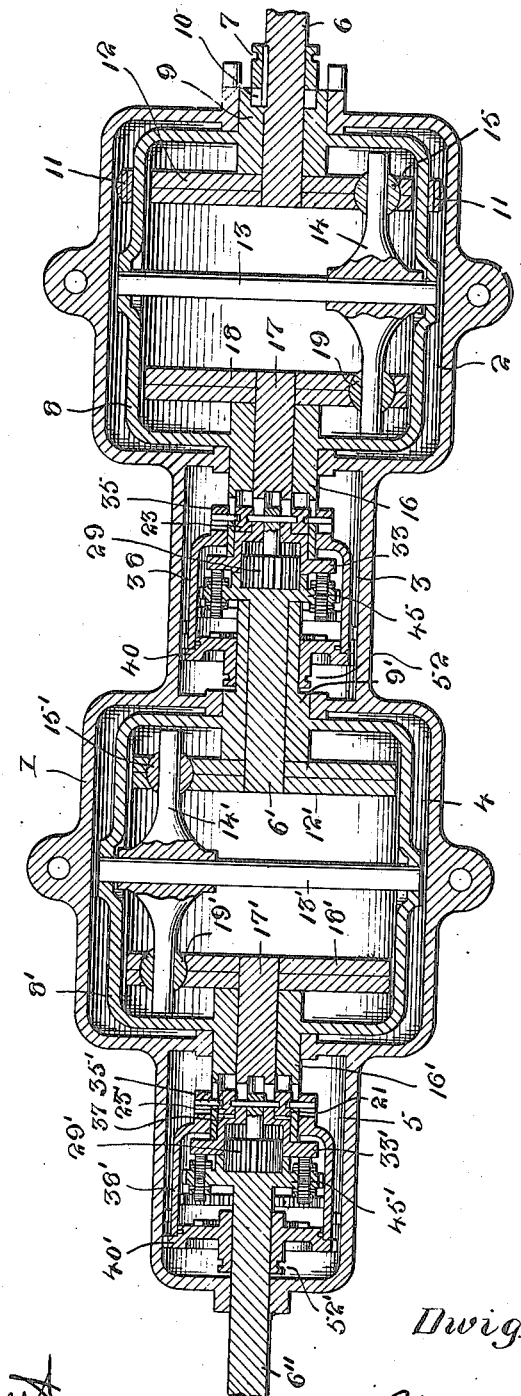

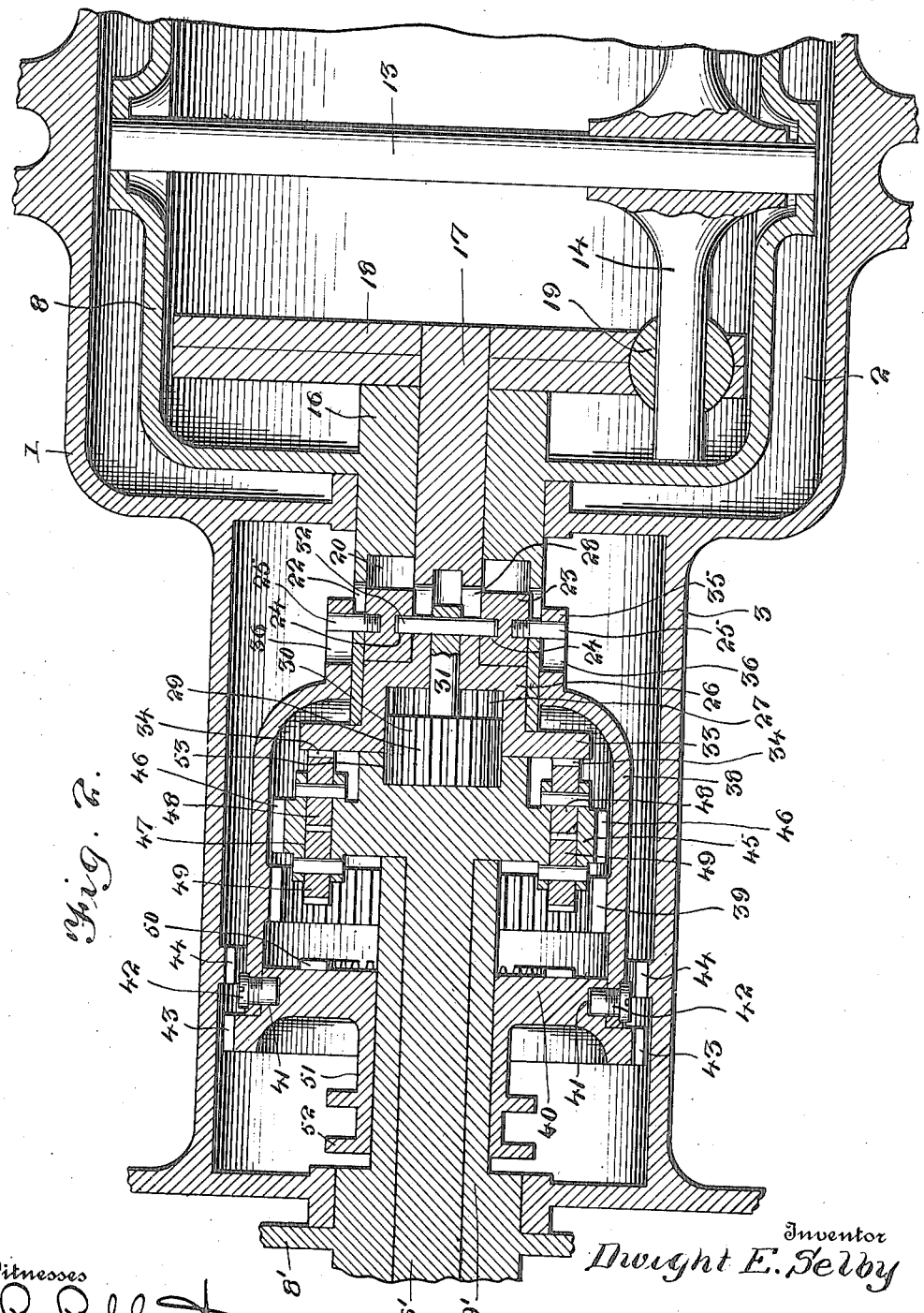

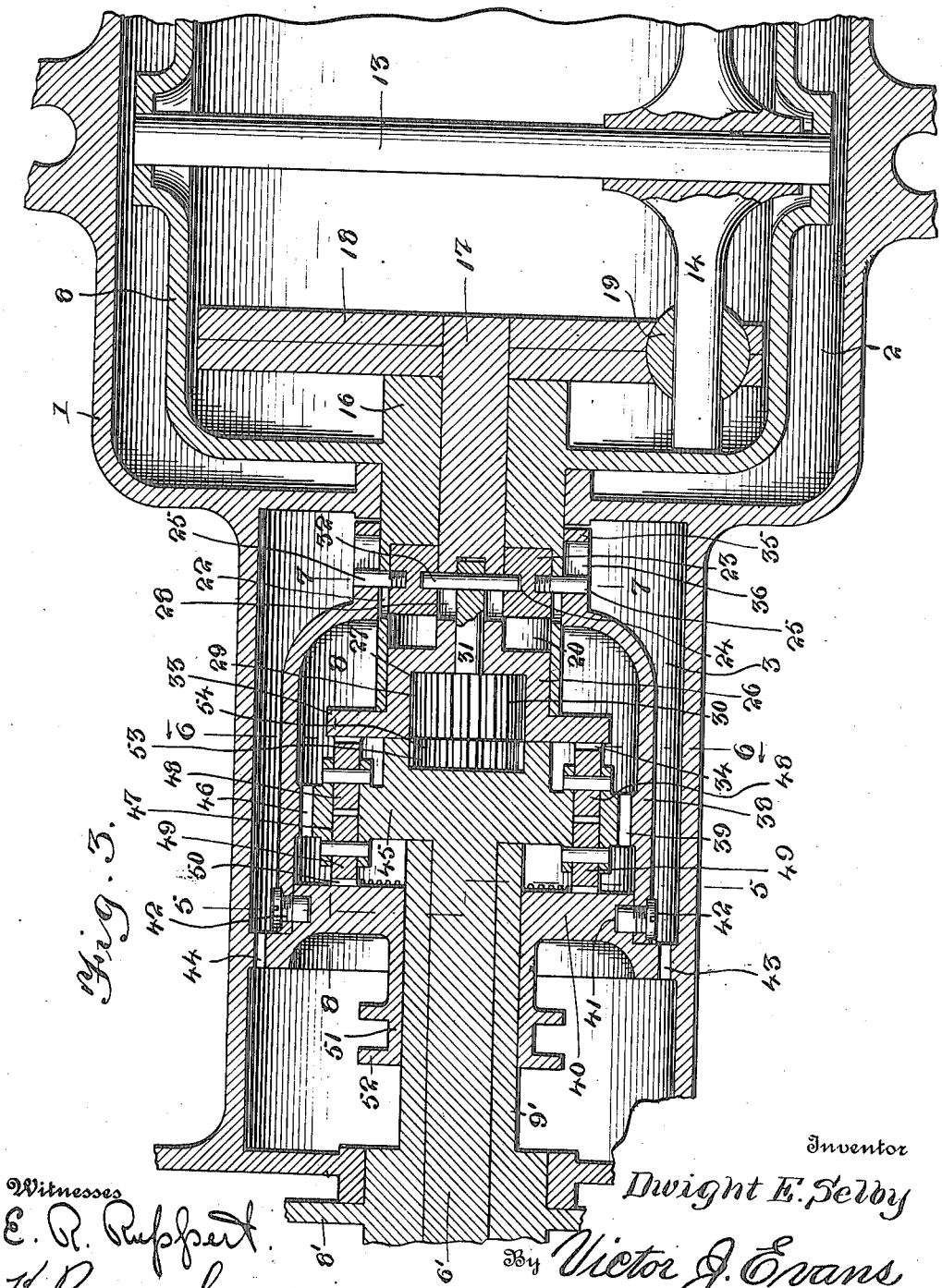

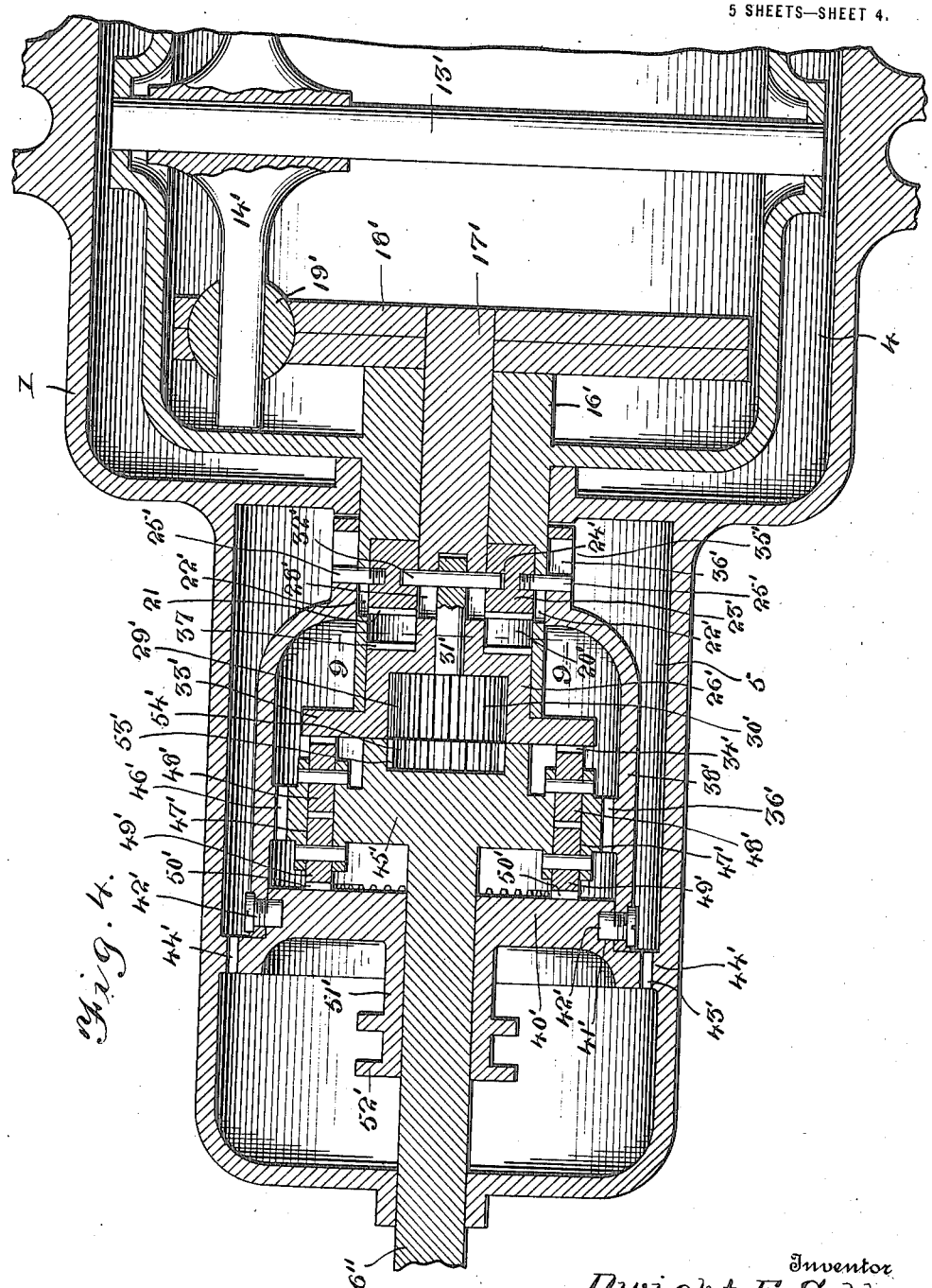

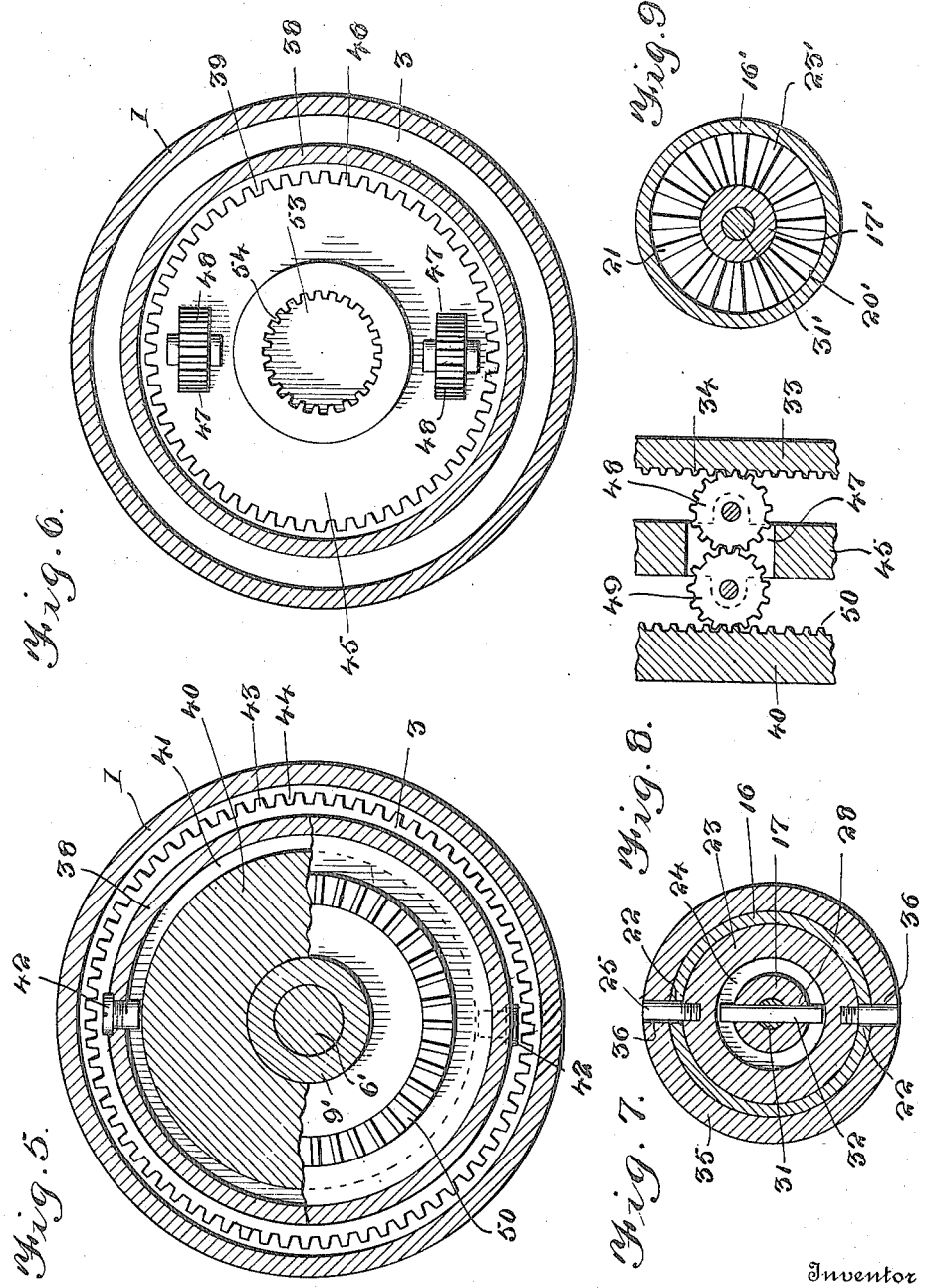

DWIGHT E. SELBY, OF SEATTLE, WASHINGTON.

GEARLESS TRANSMISSION.

1,233,924.
Specification of Letters Patent.
Patented July 17, 1917.

Application filed June 18, 1915. Serial No. 34,918.

*To all whom it may concern:*

Be it known that I, DWIGHT E. SELBY, a citizen of the United States, residing at Seattle, in the county of King and State of Washington, have invented new and useful Improvements in Gearless Transmission, of which the following is a specification.

This invention relates to gearless transmission mechanisms especially adapted to be used upon automobiles and it consists in the novel features hereinafter described and claimed.

An object of the invention is to provide a mechanism of the character indicated in which a number of different speeds may be attained when the machine is moving in a forward direction and which is also susceptible of manipulation whereby the machine upon which the mechanism is mounted may be caused to travel in a rearward direction when the said mechanism is reversed.

In the accompanying drawings:—

Figure 1 is a horizontal sectional view showing the positions of the parts when arranged for transmitting speed at the high rate.

Fig. 2 is a similar view showing the position of parts arranged for transmitting speed at an intermediate rate.

Fig. 3 is a similar view showing the position of parts arranged for transmitting speed when reversed at the high rate.

Fig. 4 is a sectional view of the rear portion of the transmission mechanism.

Fig. 5 is a transverse sectional view of the transmission mechanism cut on the line 5—5 of Fig. 3.

Fig. 6 is a similar view cut on the line 6—6 of Fig. 3.

Fig. 7 is a similar view of part of the mechanism cut on the line 7—7 of Fig. 3.

Fig. 8 is a detail sectional view of parts of the mechanism cut on the line 8—8 of Fig. 3.

Fig. 9 is a detail sectional view of part of the mechanism cut on the line 9—9 of Fig. 4.

As illustrated in the accompanying drawing the mechanism comprises a casing 1 adapted to be applied to the running gear of an automobile in any suitable manner and including compartments 2, 3, 4 and 5. The compartments 2 and 4 are relatively large as compared with the compartments 3 and 5. One end of a shaft 6 enters the forward portion of the compartment 2. The shaft 6 is the driving shaft of an engine (not shown) which may be of any suitable pattern. A clutch member 7 is slidably mounted upon the shaft 6 and is constrained to rotate in unison with the same. Any suitable mechanism may be provided for shifting the clutch member 7 along the shaft 6. A drum 8 is rotatably mounted in the compartment 2 and is provided with a hub 9 journaled in the casing 1 at the end of the compartment 2, the said hub having teeth 10 with which the clutch member 7 may engage. A band brake 11 is located in the compartment 2 and any suitable means may be provided for frictionally engaging the band brake 11 with the periphery of the drum 8 whereby the said drum may be restrained against rotation within the said compartment 2. A disk 12 is located within the drum 8 and fixed to the rear end of the shaft 6. A shaft 13 is located within the drum 8 at a point midway between the ends thereof and extends diametrically across the drum and is fixed at its ends to the opposite sides of the drum. An arm 14 is slidably mounted upon the shaft 13 and one end portion of the arm 14 is slidably received in a ball 15 turnably mounted in the disk 12. The disk 12 is composed of two sections which lie in close contact with each other whereby the ball 15 is held in the disk. The drum 8 is provided at that end opposite the end which carries the hub 9 with a hub 16 which is also journaled in the casing 1 in the partition which divides the compartment 2 from the compartment 3.

A stub shaft 17 is journaled in the hub 16 and a disk 18 is mounted upon the forward end of the stub shaft 17 and is located within the drum 8. A ball 19 is turnably mounted in the disk 18 at a point at one side of the center thereof and receives the rear end portion of the arm 14. The disk 18 is composed of two sections which lie in close contact with each other whereby the ball 19 is held therein. The hub 16 is provided at its rear end with a pocket 20 having longitudinally disposed slots 22 which at their inner ends enter the pockets 20.

A ring 23 is located in the pocket 20 and loosely receives the stub shaft 17. The ring 23 is provided at its inner side with an annular groove 24 and the said ring is provided with radially disposed fixed studs 25 which are slidably received in the slots 22. The stub shaft 17 is provided at its rear end with a head 26 having at its rear side a concentrically positioned recess the annular wall of which is provided with teeth 27. The shaft 17 is further provided in the vicinity of the head 26 with longitudinally disposed slots 28 the outer ends of which communicate with the pockets 20 provided in the hub 16. A clutch member 29 fits snugly in the recess of the head 26 and is provided with peripheral teeth 30 which mesh with the teeth 27. The clutch member 29 is provided with a shank 31 which is slidably received in the rear end of the stub shaft 17 and a pin 32 is carried by the said shank and is slidably received in the slot 28, and the ends of the pin 32 are received in the annular groove 24 provided at the inner side of the ring 23. The head 26 is provided at its rear end with an annular flange 33, the said flange having upon its rear face a set of annular gear teeth 34. The head 26 is provided at its forward face with radially disposed teeth 37 which are engaged by the teeth 21 on the ring 23 when the said ring is moved rearwardly.

A sleeve 35 is slidably mounted upon the hub 16 and is provided with longitudinally disposed slots 36 which slidably receive the end portions of the studs 25. The sleeve 35 is located in the compartment 3 of the casing 1 and is provided at its rear end with a diametrically enlarged portion 38 provided with an annular set of teeth 39 located upon the inner side thereof. A disk 40 is located within the compartment 3 and is slidably mounted upon a hub 9' journaled in the partition which separates the compartment 3 from the compartment 4. The hub 9' corresponds to the hub 9 hereinbefore described. The disk 40 is provided with an annular groove 41 which receives the studs 42 carried by the enlargement 38 of the sleeve 35. The disk 40 is further provided at its periphery with an annular set of gear teeth 43 which at times are adapted to mesh with teeth 44 mounted upon the casing 1 at the inner side of the compartment 3. A shaft 6' is journaled in the hub 9' and corresponds with the shaft 6 hereinbefore described, with the exception hereinafter noted. The shaft 6' is provided at its forward end with a flange 45 which in turn is provided with a peripheral set of teeth 46 adapted to mesh with the teeth 39. The flange 45 is provided at points equi-distant from its center with openings 47. Gear wheels 48 are journaled for rotation at the forward side of the flange 45 and the rear portions of the said gear wheels are received within the openings 47. Gear wheels 49 are journaled for rotation at the rear side of the flange 45 and the forward portions of the gear wheels 49 are received in the openings 47. The teeth of the gear wheels 48 mesh with the teeth of the gear wheels 49 and the teeth of the gear wheels 48 mesh with the teeth 34 upon the flange 33 hereinbefore described.

The disk 40 is provided upon its forward side with a set of annular gear teeth 50 which at times may be brought into gear with the teeth of the gear wheels 49. The disk 40 is provided with a sleeve 51 which surrounds the hub 9' and which at its rear end is provided with spaced flanges 52 adapted to receive between them the end portion of an operating lever (not shown).

The flange 45 is provided at its forward face with a recess 53 which corresponds in diameter with the recess provided in the head 26 and which registers with the same. The recess 53 is not as deep as the recess provided at the rear side of the head 26 but the side walls of the recess 53 are provided with an annular set of gear teeth 54 adapted to register with the gear teeth 27 in the recess of the head 26.

Within the compartment 4 there is arranged a series of elements similar to the series arranged in the compartment 2 with the exception of the bank brake 11 which is omitted from the compartment 4. The elements in the compartment 4 are shown with corresponding reference characters applied thereto as applied to the elements in the compartments 2 the exception being that the reference characters applied to the elements in the compartment 4 are primed.

There is arranged in the compartment 5 a series of elements exactly the same as that arranged in the compartment 3 and the elements in the compartment 5 which correspond with the elements in the compartment 3 are supplied with reference numerals corresponding to those applied to the corresponding parts in the compartment 3, the numerals in the compartment 5 being primed. However the ring 23' is provided at its rear face with teeth 21 and the head 26' is provided at its forward face with teeth 37 as shown in Fig. 4.

The shaft 6'' located in the rear part of the compartment 5 corresponds with the shafts 6 and 6' hereinbefore described and any suitable means may be provided for operatively connecting the shaft 6'' with the traction wheels of the automobile.

When it is desired to move the clutch member 29 so that the teeth thereof will engage both sets of teeth 27 and 54 whereby the shafts 17 and 6' are directly connected with each other, the disk 40 is moved rearwardly away from the flange 45 and consequently the teeth 50 are carried out of mesh with the teeth of the gear wheel 49. At the same time the sleeve 35 and the enlargement 38 thereof are moved rearwardly and when the forward ends of the slots 36 come in contact with the studs 25 the ring 23 is moved rearwardly along the slots 22. The rearward movement on the part of the ring 23 moves the pin 32 along the slots 28 and consequently the clutch member 29 is moved along the teeth 27 and the teeth 30 upon the said clutch member will remain in engagement with the teeth 27 and at the same time engage the teeth 54 in the recess 53. Thus the shafts 17 and 6' are directly and positively connected with each other.

When it is desired to positively connect the shafts 17' and 6" together, the disk 40' is moved in a manner the same as described in conjunction with the disk 40 whereby the clutch member 29' is carried into engagement with the teeth 27' and 54' and the teeth 21 of the ring 23' engage the teeth 37 of the head 26'. When both of the said disks are moved at the same time all of the alined shafts from 6 to 6" will be directly connected up with each other and these shafts will rotate at the same rate of speed. When the parts are connected together as just described they are arranged for the transmission of speed at the high rate from the initial to the final shaft of the series.

When it is desired to transmit the rotary movement from the initial shaft 6 to the final shaft 6" at an intermediate rate of speed, the disk 40 is moved in a forward direction whereby the clutch member 29 is carried out of engagement with the teeth 54 in the recess 53 and at the same time the teeth 50 upon the disk 40 are brought into mesh with the teeth upon the gear wheel 49 and the teeth 39 are moved into mesh with the teeth 46 upon the flange 45. This holds the shaft 17 stationary. During the rotation of the engine shaft 6 the arm 14 slides along the shaft 13 and the drum 8 is rotated at a speed equal to one-half of the rate of speed at which the shaft 6 is rotating. In view of the fact that the studs 25 are received in the slots 36 the sleeve 35 is carried around and rotary movement is transmitted from the enlargement 38 thereof through the intermeshing teeth 39 and 46 to the flange 45 of the shaft 6'. Now, if it is desired to reduce the speed to the lowest rate the disk 40' is moved in a forward direction whereby the clutch member 29' is disconnected from the flange 45' of the shaft 6". and at the same time the disk 40' is held against rotation by reason of the fact that its teeth 43' engage the teeth 44' and the enlargement 38' of the sleeve 35' positively connects with the shaft 6". It is of course understood that during these operations the speed is reduced once at the compartment 2 of the casing 1 whereby the shaft 6' is rotated approximately at one half of the rate of the speed of the shaft 6 and the speed is again reduced at the compartment 4 inasmuch as the shaft 6" is rotated approximately at one half the rate of speed at which the shaft 6' is rotating.

When it is desired to reverse the rotation of the shaft 17 with relation to the rotation of the shaft 6 the band brake 11 is applied to the periphery of the drum 8 whereby the said drum is restrained against the rotation and the clutch member 29 is engaged with the teeth 27 and the teeth 54. Inasmuch as the shaft 13 is fixed with relation to the drum 8 when the drum 8 is held against rotation the shaft 13 is held in a stationary position and consequently as the disk 12 rotates in one direction the arm 14 rotates the disk 18 in an opposite direction and the shaft 17 through the clutch member 29 transmits this rotary movement to the shaft 6'. If it is desired to rotate the shaft 6" at the same rate of speed at which the shaft 6' is rotating, the clutch member 29' is engaged with the flange 45' of the shaft 6". If however, it is desired that the shaft 6" should rotate at a slower rate of speed than the shaft 6' the clutch member 29' is disengaged from the flange 45' of the shaft 6". Therefore it will be seen that this differential transmission may be operated to produce three different speeds in a forward direction and two different speeds in a rear direction or reverse direction and that the different changes in the rate of speed may be attained without the employment of planetary gears now generally used.

The following is an epitomized explanation of the manipulation and operation of the parts of the device to attain the various rates at which the speed may be transmitted.

To obtain fast speed the clutch member 7 is moved into engagement with the teeth 10 of the hub 9. The clutch member 29 (which turns with the shaft 17) is moved into engagement with the teeth 54 in the flange 45 which is a part of the shaft 6'. Thus the flange 33 is connected with the flange 45, and the teeth 43 are disengaged from the teeth 44. Also the teeth 39 are disengaged from the teeth 46 as shown in Fig. 2. The clutch member 29' is thrown into engagement with the teeth 54' of the shaft 6" and the teeth 21 engage the teeth 37. Thus the shafts 6, 17, 6' and 6" are connected together and connected with the drums 8 and 8' and all of the said parts rotate at the rate of speed at which the shaft 6 is rotated.

To obtain intermediate speed the clutch member 7 on the shaft 6 is disengaged from the teeth 10 of the hub 9. The teeth 43 are moved into engagement with the teeth 44 whereby the disk 18 mounted on the shaft 17 is held stationary as is also the disk 40. At the same time the teeth 39 are moved into engagement with the teeth 46. The pins 42 travel around in the groove 41. When the disk 40 is moved forward by sliding the sleeve 51 the pins 42 carry the sleeve 35 forward and the pins 25 are also moved forward whereby the ring 23 is moved in the same direction. The pin 32 is moved by the ring 23 whereby the clutch member 29 is moved in a forward direction and out of engagement with the teeth 54 in the recess 53. In view of the fact that the disk 40 is held against turning movement by the teeth 43 and 44 the gear wheels 48 and 49 are carried by the flange 45 (which is a part of the shaft 6') and the sleeve 35 is turned by the hub 16 of the drum 8. Thus the shaft 17 is held stationary in view of the fact that the gear wheels 48 rotate in the opposite direction to the gear wheels 49 as they move around the axis of the shaft 6' and the disk 18 mounted on the shaft 17 serves as an anchor for one end of the arm 14. In view of the fact that the arm 14 may slide on the shaft 13 which is fastened to the drum 8, the said drum is rotated at one half of the rate of speed at which the shaft 6 is rotated. At this time the clutch member 29' is in the position as shown in Fig. 1 of the drawing.

The low speed is obtained by moving the clutch member 29' to the position as shown in Fig. 4 of the drawing whereby another reduction in the speed of rotation is had from the shaft 6 to the shaft 6''. The reverse is obtained by having the clutch mechanism of the second clutch set as for low speed as shown in Fig. 4 and the forward clutch set as for high speed and the clutch 7 disengaged from the hub 9. The brake band 11 is applied thus holding the drum 8 against turning movement and causing a reverse rotation between the shaft 6 and the shaft 17 which is caused by the leverage of the arm 14 mounted on the shaft 13. In view of the fact that the arm 14 may slide on the shaft 13 this causes a reverse rotation between the two said shafts and the reverse rotation is transmitted through the intervening parts to the final shaft 6'' and at the intermediate rate of speed.

Having described the invention what is claimed is:—

1. A transmission mechanism comprising a casing, a hub journaled therein, means for rotating the hub, alined shafts journaled in the hub and casing, means operatively connecting one shaft with the hub, a clutch mounted upon the shaft which is connected with the hub and engageable with the other shaft, means movably mounted on the hub and engageable with the casing to hold the shaft stationary and to permit the hub to rotate, and means operatively connecting the last mentioned means with the clutch member.

2. A transmission mechanism comprising a casing, a hub journaled therein, means for rotating the hub, alined shafts journaled in the hub and casing, one shaft being operatively connected with the hub, a clutch member mounted upon the shaft which is connected with the hub and engageable with the other shaft, means movably mounted on the hub and engageable with the casing to hold the shaft stationary and to permit the hub to rotate, and means operatively connecting the last mentioned means with the clutch member, said means having teeth for engagement with the shaft which is operatively connected with the hub.

In testimony whereof I affix my signature in presence of two witnesses.

DWIGHT E. SELBY.

Witnesses:
　THOS. M. ASKREN,
　E. B. PALMER.